May 14, 1940.　　　C. E. RUESCH　　　2,200,936
SAFETY WINDSHIELD
Filed Sept. 6, 1939　　　2 Sheets-Sheet 1
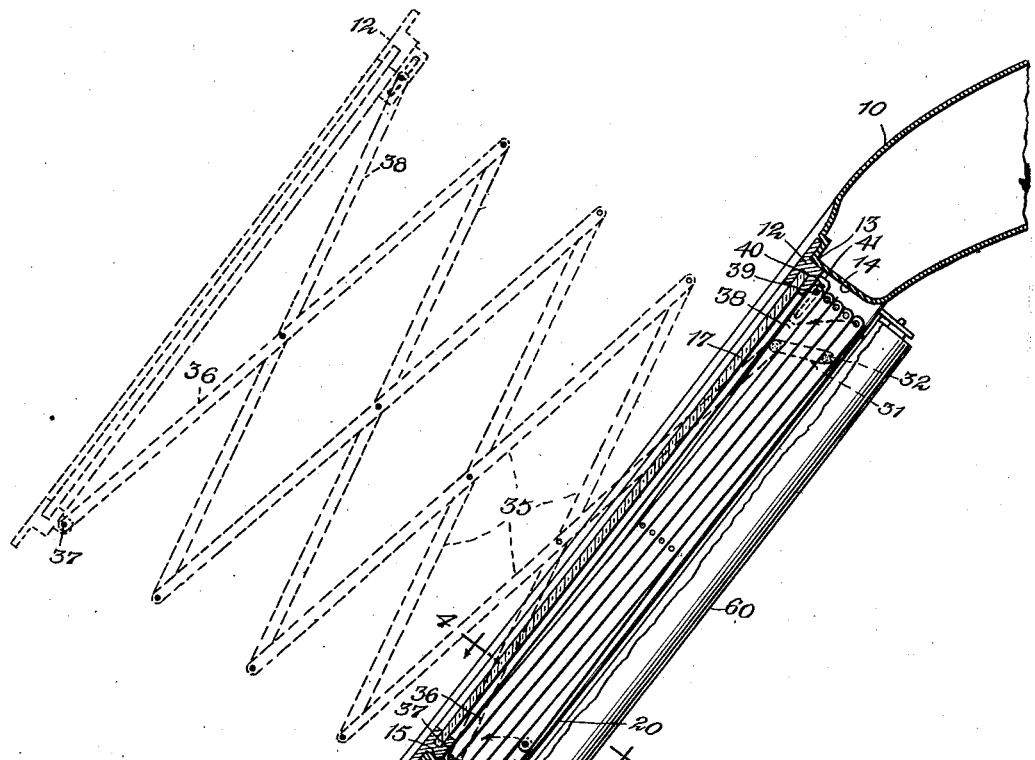
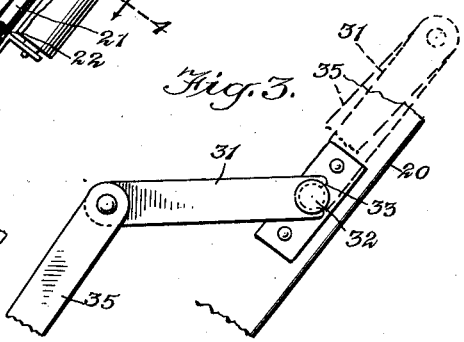
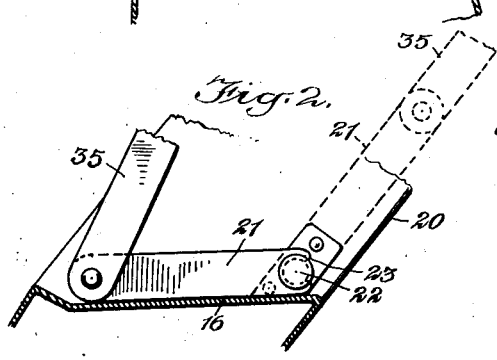
WITNESSES
INVENTOR
Carl E. Ruesch
BY
ATTORNEYS May 14, 1940.  C. E. RUESCH  2,200,936
SAFETY WINDSHIELD
Filed Sept. 6, 1939  2 Sheets-Sheet 2
Fig. 4.
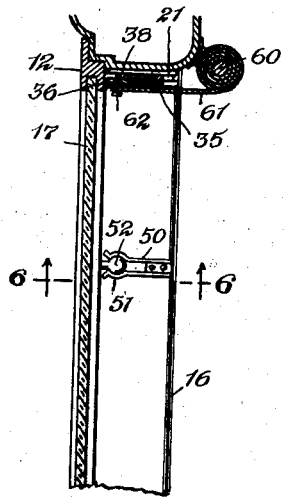
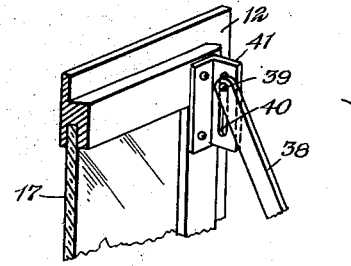
Fig. 5.
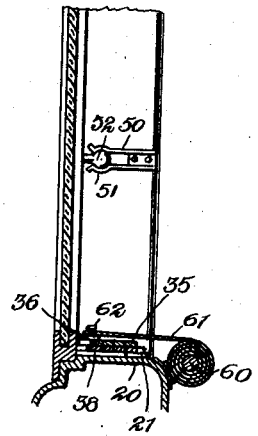
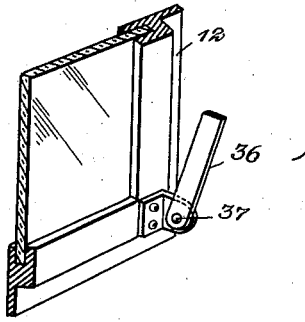
Fig. 6.
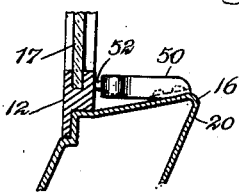
WITNESSES
INVENTOR
Carl E. Ruesch
BY
ATTORNEYS Patented May 14, 1940

2,200,936

UNITED STATES PATENT OFFICE 2,200,936

SAFETY WINDSHIELD

Carl E. Ruesch, Sayreville, N. J.

Application September 6, 1939, Serial No. 293,594

4 Claims. (Cl. 296—84)

This invention relates to visible windshields to be used on automobiles and similar devices.

The purpose of the invention is to provide certain safety features not found in windshields now in use and to prevent many of the injuries now caused by persons being thrown through the windshields of automobiles, with the resulting cuts and gashes.

Another object is to provide a windshield which may be readily removed from its normal position for any desired purpose.

A further object is to provide a windshield of the class described, which will be moved out of its normal position by the exertion of any force from the inside of the car but which, while being so removable, will not normally fall to the ground and be smashed but may be replaced with comparative ease.

It is common knowledge that many times the driver of an automobile will apply the brakes suddenly in such a manner as to throw a passenger against the windshield of the vehicle. If the force of the impact is sufficient, the glass will be broken and the passenger cut and many times fatally hurt.

It is likewise common knowledge that whenever a vehicle is brought suddenly to a stop, whether by the application of brakes or by collision, passengers are often thrown through the windshield and suffer serious injuries.

Other objects and purposes of the invention will be apparent as the description proceeds.

Fig. 1 is a sectional view showing my improved windshield in both the normal and extended positions;

Fig. 2 is a sectional view showing the lower part of the mechanism fastened to a car;

Fig. 3 is a view similar to Fig. 2, showing the upper part of the same mechanism;

Fig. 4 is a sectional plan view taken on the line 4—4 of Fig. 1;

Fig. 5 shows the mechanism fastened to both the upper and lower portions of the windshield;

Fig. 6 is a cross-sectional view on the line 6—6 of Fig. 4.

My windshield is adapted to be fitted into the ordinary automobile body between the roof 10 and the body 11. The windshield consists of the usual frame 12, provided, however, with a shoulder 13 adapted to engage the inner wall of the roof member 10 and a similar shoulder 15 adapted to engage the shoulder 16 of the body portion 11. Similar shoulders engage the posts of the windshield on either side. A glass 17 is inserted in the frame 12.

Fastened to the lower portion of the post 20 is a link 21 which engages a pin 22. The link 21 has an open end 23 which is designed to give under pressure so that it will be free from the pin 22. When the windshield is in the normal position (as shown in Fig. 1 by heavy lines) the link 21 rests against the post 20. However, when the windshield is forced outwardly the link 21 drops down (as is shown in Fig. 2). On the upper end of the post 20 a second link 31 engages the pin 32 and has a similar open end 33. In closed position the link 31 rests against the post and in the open position pivots outwardly (as shown in Fig. 3).

Pivoted to the links 21 and 31 is a lazy tong member 35 adapted to fold (as shown in Fig. 1 in heavy lines) or to be extended (as shown in dotted lines). The outer member 36 of the lazy tong is pivoted at 37 to the bottom of the windshield, and the outer lazy tong member 38 engages, by means of a pin 39 which slides in a groove 40, the bracket 41 on the windshield frame 12. It will be seen that the pin 39 is adapted to slide in the groove 40 to allow for free movement of the lazy tong 35. The bracket 41 may of course be placed on the bottom of the windshield as well as the top.

Fastened to the body 16 of the car are a plurality of fastening members 50 which may consist of a clamp 51 adapted to engage a ball 52 on the frame 12 to normally hold the windshield in a closed position. The clasp members 50 are yielding in nature and will easily give when any pressure is applied against the windshield. For further protection of the occupants of the car, a spring roll 60 of yielding material 61 may be provided on either side. The material 61 may be of rubber or fabric and is designed purely to protect the body of one thrown through the windshield from contacting the lazy tong members. The spring roll 60 will be of the conventional type used as a shade roller. An ordinary roll may be used in place of the spring roll, if so desired. This roll is mounted on the posts 20 on the outer end thereof and fastened by means of a button or pin 62 to the frame 12 so that the material will be unwound to cover the lazy tongs 35.

In operation it will be seen that the windshield in closed position will be in the normal position of any conventional windshield and the lazy tongs enclosed within the windshield posts. When force is applied to the inside of the windshield, such as would normally be exerted by the body of an occupant thrown against the windshield by a sudden stop, the yielding clasps 50 will let go and the windshield will move outwardly on the lazy tongs 35. The links 21 and 31 and the action of the sliding pin 39 in the slot 41 will allow the lazy tongs to move outwardly to the full extent. If great force is applied, such as would normally be the case in a collision, the open ends 23 and 33 of link members 21 and 31 would be disengaged from the pins 22 and 32 and the windshield would be entirely free from the car. At the same time as the windshield moves outwardly, the yielding material 61 is pulled outwardly to protect any portion of the body of the occupant which may be propelled through the space against injury on the tongs. Should the force be sufficient to entirely disengage the windshield, the roll 60 will become unwound and the material 61 will likewise disengage from the spring roller 60.

It will be seen that the large element of danger existing in the original windshield, which must necessarily break in order to give under force, is thus eliminated, and that although the force is not sufficient to entirely free the windshield from the car it will nevertheless yield to avoid breakage.

I claim:

1. In combination with a vehicle having windshield posts, a windshield, lazy tongs connecting said windshield with said windshield posts and adapted to fold within said posts, and means for holding said windshield yieldingly in normal position and to allow it to be moved out of said normal position on said lazy tongs.

2. The combination with a vehicle having windshield posts, of a windshield, contact shoulders on said windshield to frictionally engage said vehicle and posts, and foldable members connecting said windshield with said posts whereby said windshield may be moved out of contact with said posts on said folding members.

3. The combination with a vehicle having windshield posts, of a windshield, foldable members engaging said windshield, links on said foldable members having open ends, and pins on said windshield posts engaging said links.

4. In combination with a vehicle having windshield posts, a windshield, lazy tongs connecting said windshield with said windshield posts and adapted to fold within said posts, means for holding said windshield yieldingly in normal position and to allow it to be moved out of said normal position on said lazy tongs, and a roll of material in said windshield posts, one end of said material engaging said windshield and adapted to move outwardly with said windshield to shield the inner side of said lazy tongs.

CARL E. RUESCH.